United States Patent
Kajino et al.

(10) Patent No.: US 7,027,368 B2
(45) Date of Patent: *Apr. 11, 2006

(54) MOTOR CONTROL APPARATUS, DISK APPARATUS AND ACCELERATION DETECTION DEVICE

(75) Inventors: Osamu Kajino, Osaka (JP); Yoshihiro Mushika, Osaka (JP); Hiroshige Ishibashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/905,920

(22) Filed: Jan. 26, 2005

(65) Prior Publication Data

US 2005/0117477 A1    Jun. 2, 2005

Related U.S. Application Data

(62) Division of application No. 09/778,421, filed on Feb. 7, 2001, now Pat. No. 6,876,606.

(30) Foreign Application Priority Data

Feb. 7, 2000    (JP) .............................. 2000-028759

(51) Int. Cl.
    *G11B 7/00* (2006.01)
(52) U.S. Cl. ............... 369/44.27; 369/53.1; 369/44.34; 369/47.44
(58) Field of Classification Search ................... None
    See application file for complete search history.

(56) References Cited

U.S. PATENT DOCUMENTS 5,161,142 A    11/1992    Okano
6,445,657 B1    9/2002    Koudo et al.

FOREIGN PATENT DOCUMENTS

JP    6-119008    4/1994
JP    7-153208    6/1995

*Primary Examiner*—Muhammad Edun
(74) *Attorney, Agent, or Firm*—Snell & Wilmer L.L.P.

(57) ABSTRACT

A motor controlling device includes an acceleration detector for detecting an acceleration of a motor; a motor driver for supplying a driving current to the motor; a heat quantity calculator for calculating a heat quantity generated in the motor at least based on an output from the acceleration detector; and a motor controller for controlling the motor driver based on the heat quantity.

3 Claims, 11 Drawing Sheets

MOTOR CONTROL APPARATUS, DISK APPARATUS AND ACCELERATION DETECTION DEVICE

CROSS-REFERENCE TO RELATED APPLICATIONS

This application is a divisional application of U.S. Ser. No. 09/778,421, entitled "MOTOR CONTROL APPARATUS, DISK APPARATUS, AND ACCELERATION DETECTION DEVICE", which was filed on Feb. 7, 2001, now U.S. Pat. No. 6,876,606 and which claims priority to Japanese Application No. 2000-028759, filed on Feb. 7, 2000, both of which are incorporated herein by reference.

FIELD OF INVENTION

The present invention relates to a motor control device for preventing a temperature rise of an optical disk apparatus including the motor control device, based on a predicted temperature rise of a motor or the apparatus including the motor, by calculating the quantity of heat generated by the motor; and a disk apparatus including such a motor control device.

BACKGROUND OF INVENTION

Motors have conventionally been incorporated in various types of apparatus. Motors rotate a driven target by causing an electric current to flow through a motor coil and thus generating a rotation force (i.e., torque) corresponding to the size of the electric current. When a motor is rotated at a constant speed, it is sufficient to generate a torque corresponding to a load on a bearing or the like. Accordingly, only a small amount of current is required. However, when the speed of rotation needs to be rapidly accelerated or decelerated, a torque corresponding to the magnitude of the acceleration of deceleration is required. In such a case, an electric current of an amount corresponding to the required torque needs to flow. The heat generated in the motor coil by the flow of an electric current increases in proportion to the square of the size of the electric current. Therefore, the motor coil in an apparatus incorporating a motor which is rotated with rapid acceleration or deceleration generates a huge amount of heat, and accordingly it is required to prevent a temperature rise caused by the heat generation.

For example, a disk apparatus, for performing information recording and reproduction by rotating a disk as a recording medium while moving a recording head, sometimes repeats a seek operation frequently. The seek operation means the operation of moving the recording head to a desired position over the recording medium at high speed. During the seek operation, the rotation speeds of a head transporting motor for transporting the recording head and a disk motor for rotating the disk need to be rapidly changed. These motors generate a huge quantity of heat. Such heat generation caused during the seek operation raises the temperature of the disk and the elements of the disk apparatus to a level exceeding the temperature at which the disk and the elements can withstand. Solutions of this problem of temperature rise have been proposed.

Japanese Laid-Open Publication No. 6-119008, for example, discloses a system including a temperature sensor in an optical disk apparatus, which operates as follows. The temperature of the optical disk apparatus is detected. When the temperature of the optical disk apparatus exceeds a preset temperature, the operation of the optical disk apparatus is restricted, so that an excessive temperature rise is prevented.

In order to reduce the cost of components and the number of steps of assembly which are required by the provision of a temperature sensor, or in order to detect the temperature at a position at which it is difficult to directly attach a temperature sensor, technology for predicting the temperature at a desired position by calculation has been proposed. Japanese Laid-Open Publication No. 7-153208, for example, discloses a system for predicting, by calculation, a temperature rise of a voice coil motor (VCM), as a head transporting motor, based on a value of the electric current commanded to the VCM.

FIG. 10 shows a conventional magnetic disk apparatus 101 for predicting a temperature rise by calculation. The magnetic disk apparatus 101 includes a servo controller 118 and a disk enclosure (hereinafter, referred to as the "DE") 102. The servo controller 118 includes a VCM control section 135. The VCM control section 135 includes a RAM 122, a positioning control section 115, and a temperature detection section 114 for predicting the temperature of a VCM 106 (described below). The DE 102 includes a disk motor 103, a spindle 104, a magnetic disk 105, the VCM 106, and a magnetic head 107. The magnetic head 107 is moved in a radial direction of the magnetic disk 105 by the VCM 106. Thus, the magnetic head 107 is properly positioned.

In the RAM 122, various data is stored. The data to be stored in the RAM 122 includes, for example, iv (value of the electric current commanded to the VCM 106), $\Delta Qv1$ (heat quantity corresponding to the temperature rise), $\Delta Qv2$ (heat quantity spontaneously radiated), Qv (heat quantity of a measurement target), and Tv (temperature of the measurement target). The measurement target is an element, the temperature of which is to be measured. The data stored in the RAM 122 can be updated. A timer (soft timer) is set in the RAM 122. A ROM (not shown) included in the VCM control section 135 has various data already stored therein. The data stored in the ROM includes, for example, K (constant), $\theta$ (constant of thermal resistance), Cv (thermal capacity of the measurement target), Te (environmental temperature), ts (sampling time), a (constant) and b (constant).

In the disk apparatus 101 having the above-described structure, the temperature detection section 114 predicts the temperature of the VCM 106 by calculation in the following manner.

The VCM control section 135 interrupts a usual seek control every 66 μsec. (i.e., sampling time ts), and detects the position of the magnetic head 107 and updates the value iv.

Next, the temperature detection section 114 multiplies the square of the value iv by coefficient K and sampling time ts. Then, $\Delta Qv2$ is subtracted from $\Delta Qv1$. The resultant value is integrated (i.e., $Qve \leftarrow Qv + \Delta Qv1 - \Delta Qv2$) to obtain the heat quantity Qv of the measurement target. Thus, the temperature Tv of the measurement target is detected (Tv=Qv/Cv).

The above-described processing is performed every 66 μsec. (i.e., sampling time ts) to detect the temperature Ts. The detected temperature Ts is stored in the RAM 122. When the seek operation is performed, the temperature Tv is read from the RAM 122, and the seek operation is controlled based on the temperature Tv.

When the detected temperature Tv is higher than a reference value, the start of the seek operation is delayed in accordance with the temperature Tv. Thus, the temperature rise is restricted.

A delay amount D', by which the start of the seek operation is delayed, is expressed by D'=a·Tv−b as the linear function of the temperature Tv (where a and b are constants stored in the ROM).

The delay amount D' is set as follows in accordance with the temperature Tv. The reference value for the temperature is T1'. In a region where Tv≦T1', D' is set as 0; and in a region where Tv>T1', D' is set as a·Tv−b.

Accordingly, when the temperature Tv is equal to or lower than the reference value T1', the seek operation is started immediately upon receiving an instruction to seek. When the temperature Tv is higher than the reference value T1', the start of the seek operation is delayed by the delay amount which is set in proportion to the temperature Tv. In this manner, the temperature rise of the VCM 106 is restricted, and thus the VCM 106 is protected against overheating.

However, the conventional magnetic disk apparatus 101 has a problem in that the precision of calculation of the heat quantity ΔQv1 is significantly poor.

The heat quantity ΔQv1 can be found by multiplying the square of the amount of the electric current flowing through the coil of the VCM 106 by a constant (coil resistance and the time during which the electric current flows). In the above-described conventional apparatus 101, the calculation is performed using the value of the electric current commanded to the VCM 106 instead of the amount of the electric current itself. This is done with the premise that the amount of the electric current and the value of the electric current commanded to the VCM 106 are proportional with respect to each other. However, these two are not necessarily proportional to each other.

FIG. 11 is a graph illustrating the relationship between the value iv and the actual amount of the electric current i of a general motor driver IC. As shown by the chain line in FIG. 11, the conventional calculation method assumes that the value iv and the actual amount of the electric current i are proportional to each other (i=c·iv). However, there is actually a range of values iv, which is referred to as the "dead zone". In the dead zone, the amount of the electric current i which is output is zero regardless of the value iv. The size of the dead zone greatly varies among individual ICs, so that the value iv and the actual amount of the electric current i are not proportional to each other. Furthermore, in a range where the value iv is larger than a constant iv0, the relationship between values iv and i (i.e., i=c1·iv+d1) becomes i=c2·iv+d2. Therefore, the relationship between values iv and i exhibits non-linearity in that the proportionality factor (c1 and c2) varies in accordance with the range of the value iv. Additionally, constants c1, c2, d1 and d2 greatly vary among individual ICs. The value i can vary significantly with respect to the same value iv, depending on the IC.

The driver IC detects the value i and the feedback control by monitoring voltages at both ends of a detection resistor provided in series to the motor. However, the resistance of the detection resistor is set to be as small as about 0.1 Ω in order to minimize the motor driving loss. Therefore, the influence of errors of the line resistances in the IC or the like is not negligible. As a result, it is difficult to raise the precision of current detection.

For the above-described reasons, the electric current icalc calculated by the conventional method based on a value iv1 has a large error with respect to an actual electric current ireal. The heat quantity ΔQv1 calculated from the amount of the electric current icalc differs substantially from the heat actually generated in the VCM 106. Thus, the precision of temperature prediction is very poor.

Since the VCM 106 is controlled by the result of temperature prediction having such a poor precision, the following inconveniences occur: the start of the seek operation is not delayed although the actual temperature exceeds the reference value T1', which results in overheating or destruction of the VCM 106; and the start of the seek operation is delayed although the actual temperature is sufficiently lower than the reference value T1', which lowers the performance of the magnetic disk apparatus 101.

A direct detection of the actual electric current i at a high precision requires a complicated structure and undesirably raises the cost of components and the number of steps of assembly.

SUMMARY OF INVENTION

According to one aspect of the invention, a motor controlling device includes an acceleration detector for detecting an acceleration of a motor; a motor driver for supplying a driving current to the motor; a heat quantity calculator for calculating a heat quantity generated in the motor at least based on an output from the acceleration detector; and a motor controller for controlling the motor driver based on the heat quantity.

In one embodiment of the invention, the acceleration detector includes a movement distance indicating device for detecting a prescribed movement distance of the motor; and a timer for counting a time period required for the motor to move the prescribed movement distance. The acceleration detector calculates the acceleration based on an output from the movement distance indicating device and an output from the timer.

In one embodiment of the invention, the heat quantity calculator stores the relationship between the acceleration and the heat quantity, and calculates the heat quantity at least from the acceleration which is output from the acceleration detector based on the relationship.

In one embodiment of the invention, the beat quantity calculator calculates the heat quantity at least based on a first value obtained by multiplying a square of the acceleration by a first constant.

In one embodiment of the invention, the motor controlling device further includes an inertia determiner for determining an inertia of a load when the motor is driven, wherein the first constant is changed by an output from the inertia determiner.

In one embodiment of the invention, the acceleration detector calculates a prescribed rotation distance by multiplying the prescribed movement distance by a prescribed integer, and the heat quantity calculator calculates the heat quantity at least based on a sum of a first value obtained by multiplying a square of the acceleration by a first constant and a second value obtained by multiplying the prescribed rotation distance by a second constant.

In one embodiment of the invention, the motor controlling device further includes an inertia determiner for determining an inertia of a load when the motor is driven, wherein the first constant is changed by an output from the inertia determiner.

In one embodiment of the invention, the accelerator detector includes a movement distance indicating device for detecting a prescribed movement distance of the motor and generating a pulse at each prescribed movement distance, a timer for counting a time duration between generations of the pulses, and a speed calculator for calculating a speed of the motor from the time duration each time the motor moves a prescribed rotation distance which is obtained by multiplying an integer the prescribed movement distance. The acceleration detector calculates the acceleration from the speed.

In one embodiment of the invention, the prescribed rotation distance is equal to a value obtained by multiplying by an integer the rotation distance corresponding to one rotation of the motor.

In one embodiment of the invention, the acceleration detector includes a movement distance indicating device for generating a pulse each time the motor moves a prescribed angle D. A speed calculator for calculating a rotation speed $N(n)$ of the motor by expression (1) each time the movement distance indicating device generates the n'th pulse. A differential calculator for calculating an i'th acceleration $A(i)$ by expression (2) each time j pulses are generated:

$$N(n) = D/\Delta tp(n) \quad \text{expression (1)}$$

$$A(i) = (N(j \cdot i) - N(j \cdot (i-1)))/\Delta t(i) \quad \text{expression (2)}$$

where n, i and j are positive integers, $\Delta tp(n)$ is a time duration between the time when the n'th pulse is generated and the time when the (n−1)th pulse is generated by the movement distance indicating device, and $\Delta t(i)$ is a time duration between the time when the (j·i)th pulse is generated and the when the (j·(i−1))th pulse is generated by the movement distance indicating device.

In one embodiment of the invention, j is a value obtained by multiplying by an integer the number of pulses which are generated by the movement distance indicating device while the motor rotates once.

In one embodiment of the invention, the acceleration detector includes a digital filter for receiving the rotation speed $N(n)$ of the motor and outputting an average rotation speed $N'(n)$. The differential calculator calculates the acceleration $A(i)$ using the average rotation speed $N'(n)$ instead of the rotation speed $N(n)$.

In one embodiment of the invention, the digital filter calculates the average rotation speed $N'(n)$ by expression (3):

$$N'(n) = (N(n) + (m-1) \cdot N'(n-1))/m \quad \text{expression (3)}$$

where m is a positive integer.

In one embodiment of the invention, the motor controller includes a temperature calculator for calculating at least one of a temperature change of the motor and a temperature change of a driven target of the motor based on the heat quantity calculated by the heat quantity calculator, and a current controller for restricting a driving current which is output by the motor driver. The temperature change exceeds a prescribed threshold level, and the motor controller sets a restriction value of the driving current.

In one embodiment of the invention, the restriction value is changed in accordance with an amount by which the temperature change exceeds the prescribed threshold level.

According to another aspect of the invention, a disk apparatus includes a motor for rotating a disk; an optical head for recording information on the disk or for reproducing information from the disk; a motor driver for supplying a driving current to the motor; a motor controller for setting the driving current; a speed calculator for calculating a rotation speed of the motor; and a determiner for determining whether or not the rotation speed of the motor is within a range in which recording of information to the disk or reproduction of information from the disk by the optical head is possible. When the determiner determines that the rotation speed of the motor is within the range, the motor controller restricts the driving current.

In one embodiment of the invention, the motor controller sets the restriction value of the driving current to be higher as an intended rotation speed of the motor increases.

In one embodiment of the invention, the motor controller sets the restriction value of the driving current to be higher than the restriction value at the time of a start of an acceleration of the motor, before the rotation speed of the motor is maintained at the intended rotation speed.

In one embodiment of the invention, the disk apparatus further includes an acceleration detector for detecting an acceleration of the motor, a heat quantity calculator for calculating a heat quantity of the motor at least based on the acceleration which is output by the acceleration detector, and a temperature calculator for calculating a temperature change in a prescribed area of the disk apparatus based on the heat quantity. The determiner determines whether or not the temperature change is equal to or less than a prescribed threshold level. The determiner determines that the temperature change is equal to or less than the prescribed threshold level and that the rotation speed of the motor is within the range, the motor controller restricts the driving current. When the determiner determines that the temperature change is more than the prescribed threshold level, the motor controller restricts the driving current.

In one embodiment of the invention, the motor controller sets the restriction value of the driving current to be higher as an intended rotation speed of the motor increases.

In one embodiment of the invention, the motor controller sets the restriction value of the driving current to be higher than the restriction value at the time of a start of an acceleration of the motor, before the rotation speed of the motor is maintained at the intended rotation speed.

According to still another aspect of the invention, a disk apparatus includes a motor for rotating a disk; an optical head for recording information on the disk or for reproducing information from the disk; a motor driver for supplying a driving current to the motor; a motor controller for setting the driving current; a synchronous clock generator for generating a synchronous clock based on a reproduction signal which is read from the disk by the optical head; a speed calculator for calculating a rotation speed of the motor; and a determiner for determining whether or not the rotation speed of the motor is within a range in which generation of the synchronous clock is possible. When the determiner determines that the rotation speed of the motor is within the range, the motor controller restricts the driving current.

In one embodiment of the invention, the motor controller sets the restriction value of the driving current to be higher as an intended rotation speed of the motor increases.

In one embodiment of the invention, the motor controller sets the restriction value of the driving current to be higher than the restriction value at the time of a start of an acceleration of the motor, before the rotation speed of the motor is maintained at the intended rotation speed.

According to still another aspect of the invention, a disk apparatus includes a motor for rotating a disk; an optical head for recording information on the disk or for reproducing information from the disk; a motor driver for supplying a driving current to the motor; a motor controller for setting the driving current; a speed calculator for calculating a rotation speed of the motor; and a determiner for determining whether or not the optical head is recording information to the disk or reproducing information from the disk, and whether or not the rotation speed of the motor has changed. When the determiner determines that the optical head is not recording information to the disk or reproducing information from the disk and that the rotation speed of the motor has changed, the motor controller restricts the driving current.

According to still another aspect of the invention, a disk apparatus includes a motor for rotating a disk; an optical head for recording information on the disk or for reproducing information from the disk; a motor driver for supplying a driving current to the motor; a motor controller for setting the driving current; a head transporting device for transporting the optical head to a prescribed position above the disk at which recording or reproduction of information is to be performed by the optical head; a speed calculator for calculating a rotation speed of the motor; and a determiner for determining, during a seek operation in which the head is transported, whether or not the rotation speed of the motor is within a range in which information recording to the disk or information reproduction from the disk by the optical head is possible. When the determiner determines that the rotation speed is within the range, the motor controller restricts the driving current so that the rotation speed of the motor is constant for a prescribed time period.

According to still another aspect of the invention, a disk apparatus includes a motor for rotating a disk; an optical head for recording information on the disk or for reproducing information from the disk; a motor driver for supplying a driving current to the motor; a motor controller for setting the driving current; an acceleration detector for detecting an acceleration of the motor; a heat quantity calculator for calculating a heat quantity of the motor at least based on the acceleration which is output by the acceleration detector; a temperature calculator for calculating a temperature change in a prescribed area of the disk apparatus based on the heat quantity: and a determiner for determining whether or not the temperature change is equal to or more than a prescribed threshold level. When the determiner determines that the temperature change is equal to or more than the prescribed threshold level, the motor controller restricts the driving current.

According to still another aspect of the invention, a speed detection device includes a movement distance indicating device for generating a pulse each time a motor moves a prescribed movement distance; a timer for counting a time duration between generations of the pulses; and a speed calculator for calculating a speed of the motor based on the time duration each time the motor rotates a prescribed rotation distance which is obtained by multiplying by an integer the prescribed movement distance. The prescribed rotation distance is equal to a value obtained by multiplying by an integer a rotation distance corresponding to one rotation of the motor.

According to still another aspect of the invention, an acceleration detection device includes the above-described speed detection device. An acceleration is calculated from the speed.

Thus, the invention described herein makes possible the advantages of providing a motor control apparatus for preventing inconveniences caused by overheating while guaranteeing high performance by controlling a motor operation at appropriate timing with a superb heat quantity calculation function, a disk apparatus including such a motor control apparatus, and high, precision acceleration detection device and speed detection device.

These and other advantages of the present invention will become apparent to those skilled in the art upon reading and understanding the following detailed description with reference to the accompanying figures.

DETAILED DESCRIPTION

Hereinafter, the present invention will be described by way of illustrative examples with reference to the accompanying drawings.

EXAMPLE 1

Figure 1:
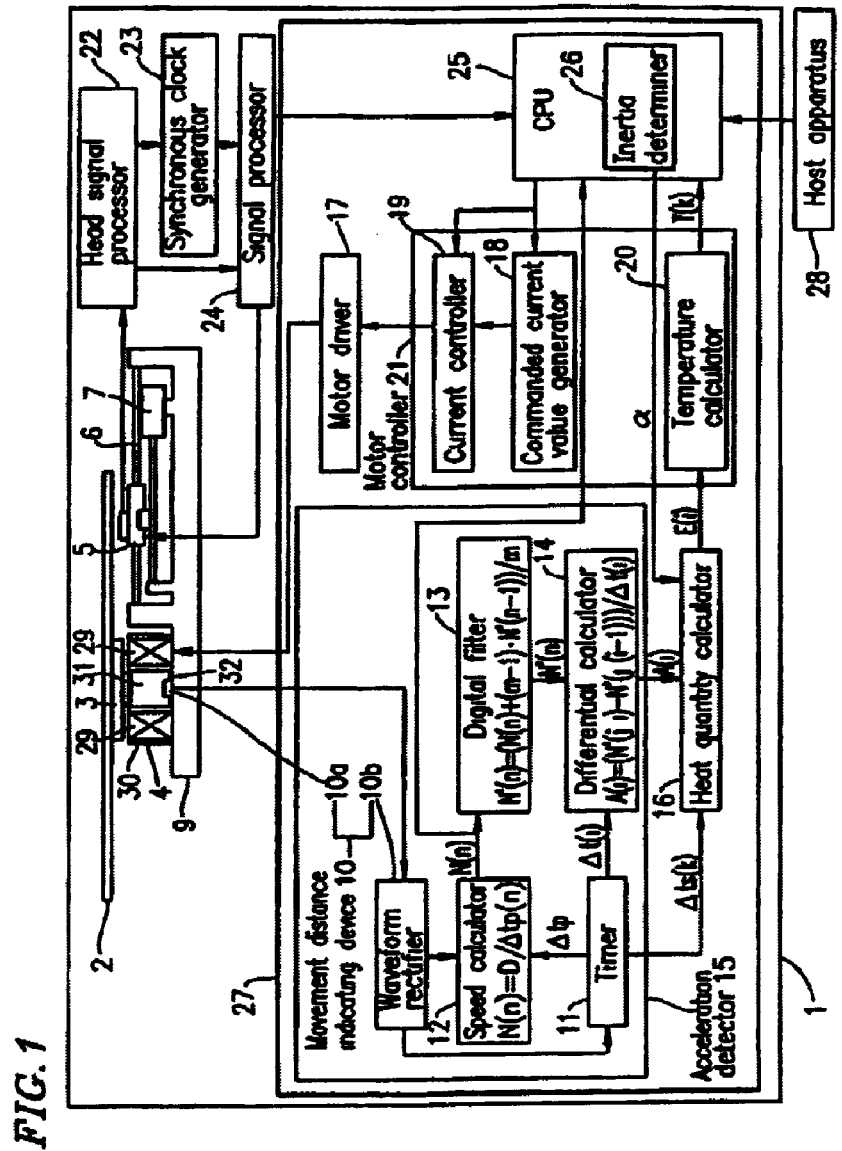
FIG. 1 is a schematic diagram illustrating a structure of a motor controller and an optical disk apparatus including the motor controller according to a first example of the present invention.

FIG. 1 is a schematic diagram illustrating a structure of an optical disk apparatus 1 according to a first example of the present invention.

The optical disk apparatus 1 includes a motor control device 27, a turntable 3 on which an optical disk 2 is placed, a disk motor 4 for rotating the turntable 3 and the optical disk 2, an optical head 5, a guide shaft 6 for supporting the optical head 5 so as to be movable in a radial direction of the optical disk 2, a head transporting motor 7 for supplying a driving force to transport the optical head 5 supported by the guide shaft 6 to a desired radial position above the optical disk 2, a chassis 9, a head signal processing circuit 22, a synchronous clock generator 23, and a signal processor 24.

The disk motor 4 includes a stator section 30 having a motor coil 29 which is supplied with an electric current and thus generates an electromagnetic field, and a rotor section 32 having a ring-shaped magnet 31. The magnet 31 includes positive and negative magnetic poles provided alternately in a circumferential direction. The disk motor 4 includes a sensor section 10a, which is an element of a movement distance indicating device 10 described below. A rotation distance of the disk motor 4 is detected by the sensor section 10a. The disk motor 4 is a DC motor.

The optical head 5 records information by directing a laser beam to the optical disk 2, and reads information by using a laser beam directed to and reflected by the optical disk 2.

The chassis 9 is formed of a resin. On the chassis 9, the disk motor 4, the guide shaft 6, the head transporting motor 7 and the like are fixed.

The motor control device 27 includes an acceleration detector 15, a heat quantity calculator 16, a motor driver 17, a motor controller 21, and a CPU 25 having an inertia determiner 26.

The acceleration detector 15 includes a timer 11, a speed calculator 12, a digital filter 13, a differential calculator 14, and a waveform rectifier 10b, which is an element of the movement distance indicating device 10 described below.

The motor controller 21 includes a commanded current value generator 18, a current controller 19, and a temperature calculator 20.

When the optical disk 2 is inserted into the optical disk apparatus 1 by a loading mechanism (not shown), the optical disk apparatus 1 determines the type of the optical disk 2 and records information to, or reproduces information, from the optical disk 2. The optical disk 2 can be a read-only optical disk such as, for example, a CD-ROM or a DVD (digital versatile disk)-ROM, or a recordable/readable optical disk such as, for example, a PD or a DVD-RAM.

The movement distance indicating device 10 is an encoder for outputting a pulse (rectangular wave) each time the disk motor 4 rotates by a unit angle D. The movement distance indicating device 10 includes the sensor section 10a including a hole element and the like, and the waveform rectifier 10b for rectifying the shape of an output signal of the sensor section 10a. The sensor section 10a is usually integrated with the disk motor 4, but may be provided separately from the disk motor 4. When integrated with the disk motor 4, the sensor section 10a is located so as to face the magnet 31 of the rotor 32 of the disk motor 4, and thus detects the strength of the positive and negative magnetic fields which change as the rotor section 32 rotates. The sensor section 10a outputs the detected strength as a sine wave. The waveform rectifier 10b is an element of the acceleration detector 15, and thus rectifies the sine wave output from the sensor section 10a into a rectangular wave and outputs the rectangular wave. A movement distance (i.e., rotation angle) of the disk motor 4 is calculated by counting the pulses output by the movement distance indicating device 10. For example, in the case where the encoder (i.e., movement distance indicating device 10) outputs six pulses during one rotation of the disk motor 4, the unit angle D by which the disk motor 4 rotates each time a pulse is output is 60 degrees. Therefore, the rotation angle can be found by multiplying the number of pulses counted by 60 degrees.

The timer 11 includes a function of counting time using an operational clock of the CPU 25. The timer 11 counts the number of clock cycles between pulses output by the waveform rectifier 10b, using the pulse as a trigger to count a time duration between the pulses; and outputs the time duration to the speed calculator 12, the differential calculator 14 and the heat quantity calculator 16 at respective appropriate timing.

Each time the movement distance indicating device 10 generates a pulse, the speed calculator 12 obtains, from the timer 11 a time duration $\Delta tp$ from the immediately previous pulse generation. Thus, the speed calculator 12 calculates a speed $N(n)$ by expression (1) shown below (where n is a positive integer). The speed $N(n)$ is a speed calculated when the n'th pulse is generated, and the speed $N(n-1)$ is a speed calculated when a pulse immediately before the n'th pulse is generated. D is the unit angle, by which the disk motor 4 moves each time a pulse is generated, as described above.

$$N(n)=D/\Delta tp(n) \quad (1)$$

The digital filter 13 calculates an average speed $N'(n)$ from the speed $N(n)$ based on expression (3) shown below.

$$N'(n)=(N(n)+(m-1)\cdot N'(n-1))/m \quad (3)$$

In the above, m is a constant defining the cut-off frequency of the digital filter 13. Usually, when the disk motor 4 rotates at a constant speed, the time duration between pulses should theoretically be constant, and also the time duration $\Delta tp$ used by the speed calculator 12 for the calculation of the speed $N(n)$ should always be the same. However, in reality, the time duration $\Delta tp$ is not the same due to, for example, a positional error of magnetic poles of the magnet 31 provided in the disk motor 4, even when the disk motor 4 rotates at a constant speed. Such an error can produce undesirable high frequency noise in the calculation result of the speed $N(n)$. This error is reduced by the digital filter 13. As a result, the prediction precision of the temperature change obtained by calculation can be improved.

The differential calculator 14 calculates an acceleration $A(i)$ from the average speed $N'(i)$ output by the digital filter 13, based on expression (4).

$$A(i)=(N'(j\cdot i)-N'(j\cdot(i-1)))/\Delta t(i) \quad (4)$$

In the above, i is a positive integer and indicates that the calculation is the i'th calculation to obtain an acceleration. In this example, j is a prescribed integer and indicates that $A(i)$ is calculated at every j'th pulse. $\Delta t(i)$ is the time duration between the $(j\cdot i)$th pulse and the $(j\cdot(i-1))$th pulse which are output by the movement distance indicating device 10. From the $(j\cdot i)$th pulse and the $(j\cdot(i-1))$th pulse, the average speeds $N'(j\cdot i)$ and $N'(j\cdot(i-1))$ are calculated. The acceleration detector 15 outputs the calculated acceleration $A(i)$ of the disk motor 4 to the heat quantity calculator 16.

The heat quantity calculator 16 calculates a heat quantity $E(i)$ generated in the disk motor 4 in accordance with expression (5).

$$E(i)=\alpha \cdot A(i)^2 \cdot \Delta t(i)+Tm\cdot j\cdot D+E(i-1) \quad (5)$$

In the above, $\alpha$ (first constant) is calculated by expression (6).

$$\alpha=R\cdot J^2/Kt^2 \quad (6)$$

In the above, R is the resistance of the motor coil 29, J is the inertia of the optical disk 2 and the rotor section 32 of the disk motor 4, Kt is the torque constant of the disk motor 4, and Tm (second constant) is a torque loaded on the bearing of the disk motor 4. Tm may be set based on any of various resistance elements instead of a friction resistance on the bearing. Also in the above, j is the number of pulses generated by the movement distance indicating device 10 between the time when the heat quantity $E(i-1)$ is found and the time when the heat quantity $E(i)$ is found, and $j\cdot D$ is referred to as the "rotation distance" of the disk motor 4.

By substituting $E1(i)$ into the first term and $E2(i)$ into the second term, $E1(i)$ can be represented by expression (7). $E1(i)$ is obtained by multiplying the square of the acceleration by the first constant.

$$E1(i)=R\cdot(J\cdot A(i)/Kt)^2\cdot\Delta t(i) \qquad (7)$$

In the above, J·A(i) is obtained by multiplying the inertia by the acceleration. Therefore, J·A(i) indicates the motor torque based on the equation of motion. Since the motor torque and the motor driving current are substantially proportional to each other (proportionality factor: torque constant Kt), J·A(i)/Kt indicates the amount of the motor driving current. Accordingly, the heat quantity E1($i$) is obtained by multiplying the square of the motor driving current by the resistance of the motor coil 29 and the time duration Δt(i).

E2($i$) as the second term of expression (5) is obtained by multiplying the torque Tm loaded on the bearing by j·D. E2($i$) is obtained by a friction-generated heat quantity which is caused by, for example, the friction at the bearing of the disk motor 4. The third term of expression (5) represents the heat quantity E(i−1) found by the (i−1)th calculation for the heat quantity by the heat quantity calculator 16.

The heat quantity E(i) generated by the heat quantity calculator 16 is found by adding the heat quantity E(i−1) to the newly generated heat quantity E1($i$) of the motor coil 29 and the friction-generated heat quantity E2($i$).

Since the DC motor torque and the motor driving current are substantially proportional to each other, the heat quantity generated by the motor coil 29 can be calculated by expression (7) with a high precision. Even in the case of a motor which does not have such a precisely proportional relationship, the heat quantity generated by the motor coil can be calculated as long as the heat quantity generated by the motor coil and the acceleration have a relationship which can be represented by a certain expression. For example, even when the motor torque and the motor driving current have a nonlinear relationship, the heat quantity generated by the motor coil can be found by expression (8). The motor torque is calculated from the acceleration by the equation of motion. The motor driving current is calculated by the motor torque.

$$E1(i)=R\cdot I(i)^2\cdot\Delta t(i) \qquad (8)$$

In the above, I(i) is the motor driving current.

The motor driver 17 supplies an electric current to the disk motor 4 in accordance with the commanded current value which is input by the commanded current value generator 18.

The commanded current value generator 18 receives, from the CPU 25, an intended position of the optical disk 2 at which information is to be recorded or reproduced. The commanded current value generator 18 calculates the rotation speed of the disk motor 4 which is required to record or reproduce information at the intended position. Then, the commanded current value generator 18 compares the rotation speed of the disk motor 4 at that point and an intended rotation speed. When the two speed do not match each other, the commanded current value generator 18 instructs acceleration or deceleration required to make the speeds match each other. The commanded current value generator 18 also generates an "commanded current value" which represents the amount of the electric current which is commanded by the motor controller 21 to the motor driver 17 as the amount to flow through the disk motor 4 at the time of acceleration or deceleration. The commanded current value is output to the motor driver 17.

The current controller 19 changes the commanded current value generated by the commanded current value generator 18 and thus restricts the amount of the driving current supplied by the motor driver 17 to the disk motor 4. The current controller 19 receives, from the CPU 25, a restriction instruction flag which indicates whether the driving current is to be restricted or not. When the driving current is to be restricted, the current controller 19 receives data indicating a restriction range and operates in accordance with the data command. Restriction of the driving current suppresses the heat generation in the disk motor 4 and thus suppresses a temperature rise.

The temperature calculator 20 calculates a k'th predicted temperature change value T(k) of a control target. The control target may be the disk motor 4 or any element of the optical disk apparatus 1, the temperature of which is to be controlled. The k'th predicted temperature change value T(k) is calculated by expression (9) based on the (k−1)th predicted temperature change value T(k−1), the time duration Δts(k) between the time when T(k) is found and the time when T(k−1) is found, and the heat quantity E(i).

$$T(k)=\exp\{-\Delta ts(k)/\tau\}\cdot T(k-1)+Kc\cdot E(i) \qquad (9)$$

In the above, k, τ and Kc are positive constants. The predicted temperature change value T(k) is not the temperature change of the control target itself, but is the temperature difference between the control target and the environment of the control target. More precisely, the calculation of expression (9) has the premises that the thermal capacity of the environment is sufficiently large and that the temperature change of the environment is slower than the temperature change of the control target. Among the constants, τ and Kc represent the time constant and the thermal capacity of the control target, respectively. The first term of the right side of expression (9) represents a temperature fall by spontaneous heat radiation, and the second term represents a temperature rise by the heat quantity E(i). The values of τ and Kc are obtained by experiment and are stored in the ROM (not shown) in the motor control device 27. Elements which are controlled by the motor control device 27 can include, for example, the disk motor 4 and driven targets of the disk motor 4 such as the optical disk 2.

The motor controller 21 controls the motor driver 17 based on an instruction from the CPU 25.

The head signal processor 22 converts a signal read by the optical head 5 from the optical disk 2 and outputs the converted binary signal into the synchronous clock generator 23 and the signal processor 24.

The synchronous clock generator 23 includes a PLL circuit (not shown) and generates a clock signal which is synchronized with a binary signal output from the head signal processor 22. In the case where the optical disk 2 is of a CLV (Constant Linear Velocity) system for controlling the linear velocity of the optical disk 2 at the recording or reproduction position to be substantially constant, the rotation speed of the disk motor 4 at which a synchronous clock can be generated varies in accordance with the radial position at which the recording or reproduction is performed. A synchronous clock can be generated within a prescribed range of rotation speeds around a rotation speed which is predetermined for each radial position. The recording or reproduction can be performed only after generation of a synchronous clock becomes possible. During a seek operation for changing the recording or reproduction position, the rotation speed of the optical disk 2 is required to be put within the rotation speed range in which a synchronous clock can be generated.

The signal processor 24 performs demodulation, error correction and the like based on a clock signal generated by the synchronous clock generator 23 and a binary signal output by the head signal processor 22. Then, the signal processor 24 generates a data signal and thus reproduces information recorded on the optical disk 2. The signal processor 24 also outputs an information signal to be recorded based on the clock signal to the optical head 5 and thus records the information on the optical disk 2.

The CPU 25 controls the entire optical disk apparatus 1 based on the programs and data which are stored in advance in the ROM (not shown). For example, the CPU 25 exchanges commands with, or transfers data to, a host apparatus 28 through a SCSI or other interface (not shown). The CPU 25 also controls various elements of the optical disk apparatus 1 including the motor controller 21. For example, immediately before starting a seek operation based on an instruction from the host apparatus 28 to reproduce or record information, the CPU 25 obtains a predicted temperature value of a prescribed position (for example, inner or outer circumference of the optical disk 2) from the temperature calculator 20. Then, based on the predicted temperature value, the CPU 25 sends an instruction to the commanded current value generator 18 and the current controller 19. Thus, the CPU 25 controls the driving current of the disk motor 4.

The operation of the inertia determiner 26 is executed by the CPU 25 as a program stored in the ROM (not shown). The inertia determiner 26 determines the difference in the diameter of different optical disks based on the data signal which is output from the signal processor 24 and thus calculates an inertia. Then, the inertia determiner 26 outputs the inertia to the heat quantity calculator 16 as the constant α (first constant).

The acceleration detector 15, the heat quantity calculator 16, the motor driver 17, the motor controller 21, the head signal processor 22, the synchronous clock generator 23, the signal processor 24, and the CPU 25 may be provided on a circuit board.

The motor control device 27 and the optical disk apparatus 1 including the motor control device 27 operate, for example, in the following manner.

First, the CPU 25 initializes each of variables which are output by the acceleration detector 15 and the heat quantity calculator 16 to an initial value (i.e., the O'th value). Specifically, the speed $N(0)$ found by the speed calculator 12, the average speed $N'(0)$ found by the digital filter 13, the acceleration $A(0)$ found by the differential calculator 14, and the heat quantity $E(0)$ found by the heat quantity calculator 16 are all set to 0. The CPU 25 temporarily sets the initial value of the first constant α which is used by the heat quantity calculator 16 for calculating the heat quantity $E(i)$ to, for example, a value calculated in advance using the inertia of a 12-cm disk (expression (6)). The CPU 25 also sets the initial value $T(0)$ of the predicted temperature change value found by the temperature calculator 20 to 0. Thus, the initialization of each of the variables is completed.

Then, the CPU 25 causes the timer 11 to start counting time. Based on an instruction of the CPU 25, the commanded current value generator 18 causes the disk motor 4 to rotate at a predetermined intended rotation speed. In order to realize this, the commanded current value generator 18 compares the intended rotation speed and the rotation speed of the disk motor 4 at that time, and outputs a commanded current value in accordance with the difference of the two speeds, to the motor driver 17. Since the disk motor 4 is not in operation when the disk apparatus 1 has just started, the commanded current value generator 18 supplies a maximum possible commanded current value to the motor driver 17, so that the disk motor 4 can be rotated at a maximum rotation acceleration. Thus, the motor driver 17 supplies an electric current to the disk motor 4, and the disk motor 4 starts rotating. When the rotation speed reaches the intended rotation speed, the commanded current value generator 18 reduces the commanded current value to a value which is necessary to rotate the disk motor 4 at a constant speed, so that the disk motor 4 keeps rotating at the intended rotation speed.

The CPU 25 controls the driving of the head transporting motor 7 so as to move the optical head 5 to a prescribed position above the optical disk 2. The head transporting motor 7 may be controlled by a motor control device which is similar to the motor control device 27 provided for controlling the driving of the disk motor 4.

Simultaneously with the start of the rotation of the disk motor 4, the CPU 25 causes the optical head 5 to start reading a signal from the optical disk 2. The read signal is converted into a binary signal by the head signal processor 22 and is input to the synchronous clock generator 23. The synchronous clock generator 23 can only generate a synchronous clock within a prescribed rotation speed range (which changes in accordance with the radial position at which the recording or reproduction is performed). Immediately after the start of the disk motor 4, the rotation speed is too low to generate a synchronous clock. When the rotation speed of the disk motor 4 increases and reaches the prescribed rotation speed range, the signal processor 24 can generate a data signal from the binary signal which is output from the head signal processor 22 and the synchronous clock. Thus, the optical disk apparatus 1 is ready to perform recording or reproduction. The type of the disk mounted on the optical disk apparatus 1 is determined based on the data signal generated by the signal processor 24, and various parameters and the like required to control the determined type of disk are set.

The inertia determiner 26 re-sets the first constant α used by the heat quantity calculator 16 for calculating the heat quantity $E(i)$ to the value determined for each disk type. In the case of an 8-cm disk, for example, the first constant α is re-set to the value calculated by expression (6) with the value of j being changed in accordance with the inertia of the 8-cm disk.

When the disk motor 4 starts rotating and the movement distance indicating device 10 starts outputting pulses, the speed calculator 12, the digital filter 13, the differential calculator 14, and the heat quantity calculator 16 start calculating the speed N, the average speed N', the acceleration A and the heat quantity E, respectively.

Figure 2:
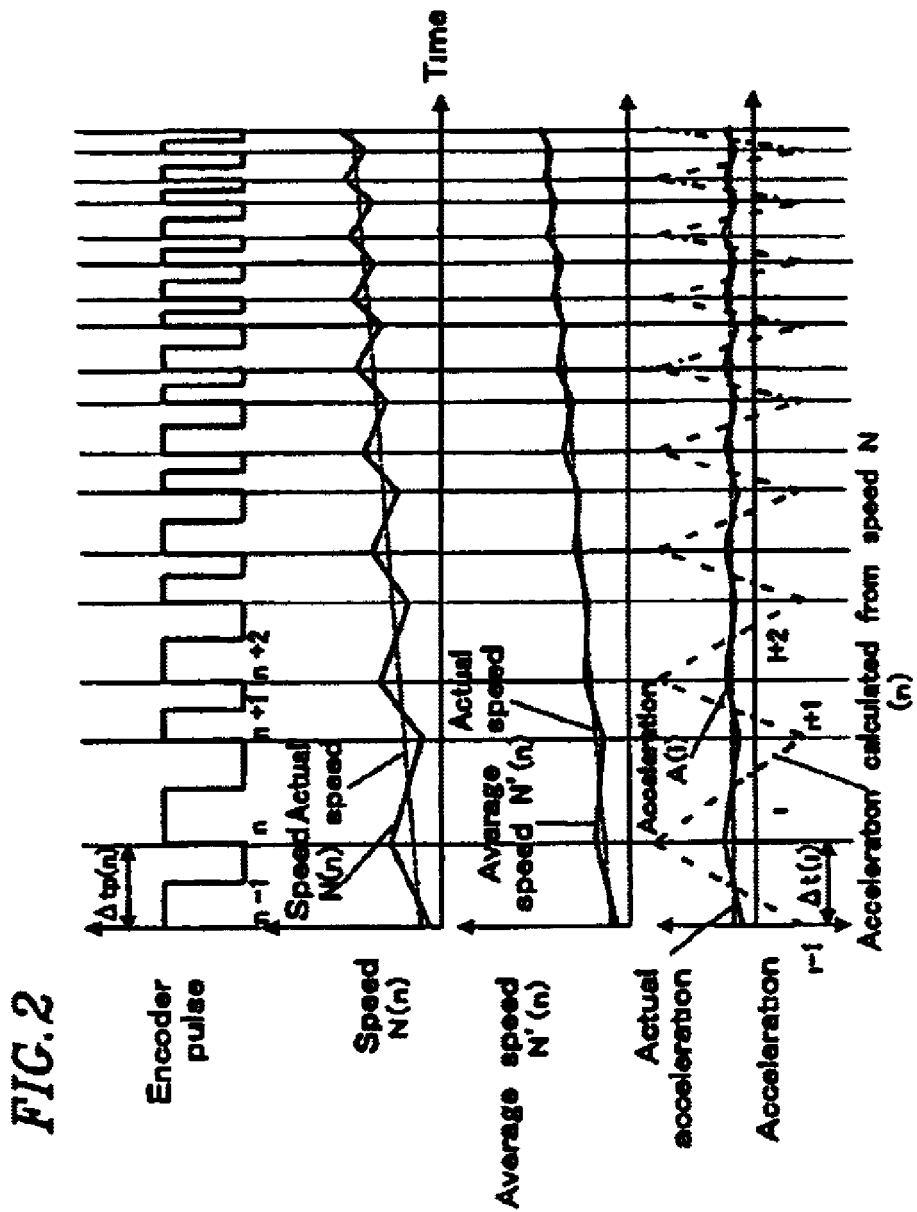
FIG. 2 is a timing diagram illustrating an example of a change in the rotation speed of a disk motor in the optical disk apparatus according to the first example.

FIG. 2 is a timing diagram illustrating the rotation speed of the disk motor 4 (FIG. 1) which increases at a constant acceleration. FIG. 2 shows the speed $N(n)$, the average speed $N'(n)$ and the acceleration $A(n)$ in relation to the pulses generated by the movement distance indicating device 10.

The speed calculator 12 obtains the time duration $\Delta tp(n)$ between the pulses generated by the movement distance indicating device 10 from the timer 11 and calculates the speed $N(n)$ in accordance with expression (1) each time a pulse is generated. The obtained speed $N(n)$ generally includes an error with respect to the actual speed, due to the positional error of the magnetic poles of the magnet 31 or the like. The digital filter 13 removes a high frequency component as the error included in the speed $N(n)$ and thus obtains the average speed $N'(n)$ in accordance with expression (3). The differential calculator 14 calculates the acceleration $A(i)$ in accordance with expression (4) based on the average speed $N'(i)$ and the time duration $\Delta t(i)$. Here, j=1, and since the acceleration $A(i)$ is found each time a pulse is generated, i=n. If the acceleration $A(i)$ was calculated using the speed $N(n)$ instead of the average speed $N'(n)$, the error with respect to the actual speed would be significantly larger than the error shown in FIG. 2. Using the average speed N'(n) instead of the speed N(n) to obtain the acceleration A(i), the calculation error can be significantly reduced. Therefore, the heat quantity can be calculated and the temperature rise can be predicted sufficiently accurately.

Returning to FIG. 1, the heat quantity calculator 16 uses the obtained acceleration A(i) to calculate the heat quantity E(i) of the disk motor 4 in accordance with expression (5). Expression (5) considers the heat quantity generated in the motor coil 29 which is found from the acceleration A(i) as well as the friction-generated heat quantity which is caused by the load on the bearing of the disk motor 4. Thus, the precision of the calculation of heat quantity is improved. Since the acceleration A(i) is calculated each time a pulse is generated by the movement distance indicating device 10, j=1. The friction-generated heat quantity is found by multiplying the unit angle D by the torque Tm loaded on the bearing, of the disk motor 4. The calculation of the heat quantity E(i) by the heat quantity calculator 16 can always be performed while the optical disk apparatus 1 is in operation.

The temperature calculator 20 calculates the predicted temperature change value T(k) in accordance with expression (9) immediately before a seek operation (described below). In the case where no seek operation is performed for an extended period of time, the predicted temperature change value T(k) is calculated every constant time interval or when the heat quantity exceeds a prescribed value. In this manner, a temperature rise of the disk motor 4 can always be controlled at an appropriate time.

After the predicted temperature change value T(k) is calculated, the CPU 25 initializes the heat quantity E(k) to 0. This initialization prevents the accumulated heat quantity E from becoming too large and thus prevents the digital value of the heat quantity E from being saturated.

The initialization of the optical disk apparatus 1 is now completed. The optical disk apparatus 1 goes into a wait state for a request from the host apparatus 28 to record or reproduce information. The optical disk apparatus 1 records or reproduces information when receiving such an instruction from the host apparatus 28.

Hereinafter, a seek operation for transporting the optical head 5 in a radial direction of the optical disk 2 to a prescribed radial position above the optical disk 2 so as to perform information recording or reproduction will be described.

When the host apparatus 28 issues a request to record or reproduce information, the CPU 25 calculates an intended position at which the information recording or reproduction is to be performed. The CPU 25 drives the head transporting motor 7 to transport the optical head 5 to the intended position. Simultaneously, the CPU 25 notifies the commanded current value generator 18 of the intended position. The commanded current value generator 18 calculates a rotation speed of the disk motor 4 required at the intended speed as the intended rotation speed.

In the case where the optical disk 2 is of a CLV system, the rotation speed of the disk motor 4 needs to be changed to the predetermined intended rotation speed before the seek operation. In this case, a huge amount of electric current is caused to flow through the disk motor 4. When the seek operations are continued for an extended period of time, temperature of the disk motor 4 rises to an excessively high level. In order to avoid this, the temperature calculator 20 predicts the temperature change value before the rotation of the disk motor 4 starts accelerating or decelerating, and the manner of driving the disk motor 4 is adjusted based on the result.

Now, a seek operation performed when the temperature change value predicted by the temperature calculator 20 is relatively large and when the value is relatively small will be described.

Figure 3:
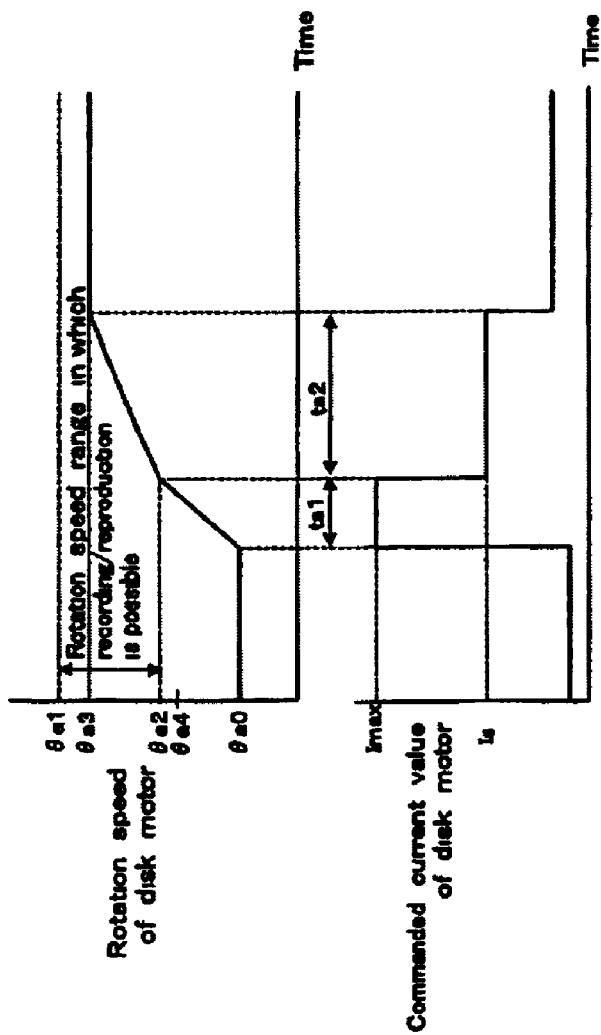
FIG. 3 is a timing diagram illustrating a seek operation when a predicted temperature change value is relatively small according to the first example.

FIG. 3 is a timing diagram illustrating an example of a change of the rotation speed of the disk motor 4 (FIG. 1) when the predicted temperature change value is relatively small.

The disk motor 4 is assumed to rotate at a constant speed θa0. The intended rotation speed θa1, which is higher than the speed θa0 is set to perform recording or reproduction at an inner position of the optical disk 2. The rotation of the disk motor 4 is accelerated to the intended rotation speed θa1. The rotation speed of the disk motor 4 can be calculated by the speed calculator 12. The CPU 25 can determine various states of the optical disk apparatus 1 including the rotation speed of the disk motor 4, the temperature change in an arbitrary area of the optical disk apparatus 1 and the operation of the optical head 5. Then, the CPU 25 can issue various commands to various elements of the optical disk apparatus 1. Immediately after the start of the operation of the optical disk apparatus 1 when the temperature rise is still small and thus the predicted temperature change value T is smaller than a threshold temperature change value Tth, the CPU 25 instructs the current controller 19 not to restrict the driving current. Then, the motor driver 17 receives the maximum commanded current value (Imax) and supplies the corresponding driving current to the disk motor 4. The disk motor 4 starts acceleration at the maximum acceleration (period ta1). The transportation of the optical head 5 is simultaneously started. Usually, the time period required to transport the optical head 5 to the intended position is far shorter than the time period required to cause the rotation speed of the disk motor 4 to reach the intended rotation speed. The optical head 5 reaches the intended position soon after the start of the seek operation.

The rotation speed of the disk motor 4 gradually increases and reaches the rotation speed range within which a synchronous clock can be generated (θa2 to θa1). Then, the synchronous clock generator 23 outputs a synchronous clock. When information reproduction is to be performed, generation of a data signal by the signal processor 24 becomes possible after generation of a synchronous clock becomes possible. Thus, the optical disk apparatus 1 is prepared for reading or reproduction. After confirming that the recording/reproduction is now possible, the CPU 25 instructs the current controller 19 to restrict the driving current and notifies the current controller 19 of a restriction value Ia. Thus, the amount of the current supplied to the disk motor 4 is restricted, which slows the rise of the rotation speed of the disk motor 4 (period ta2). Since the rotation speed of the disk motor 4 is already in the range in which information recording or reproduction is possible (θa2 to θa1), the signal processor 24 can continue recording or reproduction without any inconvenience. Since the reduction in the amount of the current supplied to the disk motor 4 suppresses heat generation, the temperature rise can be reduced without adversely influencing the recording or reproduction.

The heat quantity calculator 16 calculates the heat quantity in consideration of the rotation acceleration of the disk motor 4. Accordingly, even when the value of the current supplied to the disk motor 4 changes during the seek operation, the heat quantity can still be calculated accurately with no influence of the change.

The lower limit of the rotation speed range in which generation of a synchronous clock is possible may be lower than the lower limit θa2 of the rotation speed range in which recording or reproduction is possible (θa2 to θa1). For example, the rotation speed range in which generation of a synchronous clock is possible may be the range of θa4 to θa1 shown in FIG. 3. θb4, θc4 and θd4 in FIGS. 4, 8 and 9 described below also show that the lower limit of the rotation speed range in which generation of a synchronous clock is possible may be lower than the lower limit of the rotation speed range In which recording or reproduction is possible.

From the time when the rotation speed of the disk motor 4 reaches the lower limit of the rotation speed range in which generation of a synchronous clock is possible (θa2) and a synchronous clock is generated until the time when recording or reproduction is performed, there is a time lag although very short. During the time lag, the disk motor 4 continues accelerating. In this example, the driving current is restricted when the rotation speed of the disk motor 4 reaches the range in which recording or reproduction is possible. Alternatively, the driving current is restricted when the rotation speed of the disk motor 4 reaches the range in which generation of a synchronous clock is possible. In this case, the driving current is restricted earlier for the time lag. Consequently, the heat generation can be further suppressed. This manner of restriction is also effective in the case where the lower limit of the rotation speed range in which generation of a synchronous clock is possible is lower than the lower limit of the rotation speed range in which recording or reproduction is possible as described above.

In the case where the acceleration or deceleration of the rotation of the disk motor 4 is reduced during the seek operation, the operation of the signal processor 24 can be more stable until the reproduction starts. In this manner, the time period required to start reproduction after the generation of a synchronous clock becomes possible can be shortened.

When the driving current is restricted while the rotation speed of the disk motor 4 is in the range in which generation of a synchronous clock is possible or in the range in which recording or reproduction is possible, the time period required for the disk motor 4 to reach the intended rotation speed is extended. While the rotation is accelerated, the time period in which recording or reproduction is performed at a low rotation speed is extended. Thus, the transfer rate (amount of information recorded or reproduced per unit time) is lowered. By contrast, while the rotation speed is decelerated, the time period in which recording or reproduction is performed at a high rotation speed is extended. Thus, the transfer rate is raised. On average, the transfer rate is not substantially lowered, and only the heat generation is suppressed.

In the case where the rotation speed of the disk motor 4 is already in the range in which the generation of a synchronous clock is possible or in the range in which recording or reproduction is possible before the start of the seek operation, the driving current is restricted immediately after the start of the seek operation.

For recording and reproduction of information, the rotation speed range in which the recording or reproduction is possible can be different from each other, and thus the time to start restricting the driving current can be different from each other. Except for this point, the operation is substantially the same.

In the case where the amount of information requested by the host apparatus 28 to be recorded or reproduced is small and the information is completely recorded or reproduced before the rotation speed of the disk motor 4 matches the intended rotation speed θa1, the motor controller 21 changes the intended rotation speed to the rotation speed of the disk motor 4 at the time when the recording or reproduction is completed (θa3, end of period ta2) as shown in FIG. 3. Such an operation stops the rise of the rotation speed of the disk motor 4, and the disk motor 4 continues rotation at the speed θa3. This avoids unnecessary acceleration or deceleration of the disk motor 4 after the recording or reproduction is completed. As a result, the heat generation in the disk motor 4 can be suppressed and the temperature rise can be restricted.

In the case where the amount of information requested by the host apparatus 28 to be recorded or reproduced is excessively large, the rotation of the disk motor 4 may be accelerated until the rotation speed of the disk motor 4 matches the intended rotation speed θa1. When the recording or reproduction of the information requested by the host apparatus 28 is not completed even after the rotation speed of the disk motor 4 matches the intended rotation speed θa1, the recording or reproduction is continued while the rotation speed is kept at the intended rotation speed of θa1.

The optical disk apparatus 1 may be set so that in the case where the rotation of the disk motor 4 is accelerated when the recording or reproduction is completed, the acceleration is continued, and in the case where the rotation of the disk motor 4 is decelerated when the recording or reproduction is completed, the deceleration is stopped. In such a, case, the rotation speed of the disk motor 4 can be kept high and the transfer rate can be increased.

Next, a seek operation performed when the temperature change value predicted by the temperature calculator 20 (FIG. 1) is relatively large will be described.

Figure 4:
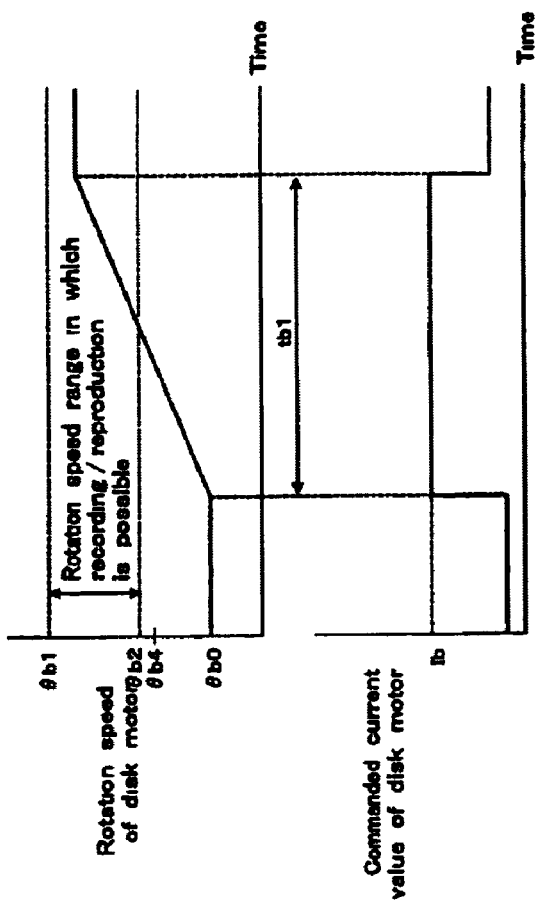
FIG. 4 is a timing diagram illustrating a seek operation when a predicted temperature change value is relatively large according to the first example.

FIG. 4 is a timing diagram illustrating an example of a change of the rotation speed of the disk motor 4 when the predicted temperature change value is relatively large.

The disk motor 4 is assumed to be rotating at a constant speed θb0. The intended rotation speed θb1, which is higher than the speed θb0 is set to perform recording or reproduction above an inner position of the optical disk 2. The rotation of the disk motor 4 is accelerated to the intended rotation speed θb1. When the predicted temperature change value T found by the temperature calculator 20 immediately before the seek operation is larger than the threshold temperature change value Tth, the driving current is restricted to the commanded current value Ib immediately after the start of the seek operation, regardless of the rotation speed range in which generation of a synchronous clock is possible (θb2 to θb1). As the predicted temperature change value T is larger, the restriction value Ib is set to be smaller. Thus, the amount of the current supplied to the disk motor 4 is restricted during the seek operation, and therefore the temperature rise can be restricted.

Figure 5:
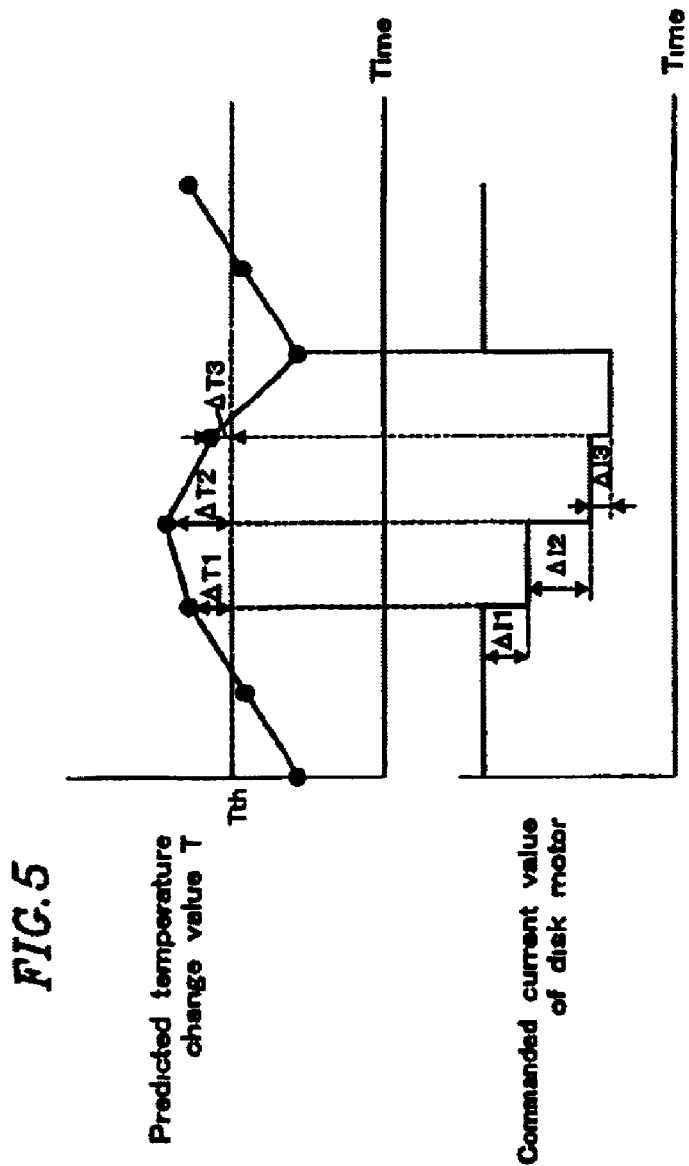
FIG. 5 is a timing diagram illustrating the relationship between the predicted temperature change value and the commanded current value according to the first example.

FIG. 5 is a timing diagram illustrating an example of the relationship between the predicted temperature change value and the commanded current value.

In the case where the predicted temperature change value T calculated immediately before the start of a seek operation exceeds the threshold temperature change value Tth, the restriction value of the driving current is set to be smaller than the restriction value set for the previous seek operation in accordance with the difference between the values T and Tth. When, for example, seek operations are continued, and the predicted temperature change value T is slightly lower than the threshold temperature change value Tth when one seek operation is completed and the predicted temperature change value T significantly exceeds the threshold value Tth when the next seek operation is completed, the restriction value of the driving current is set to be small to restrict the heat generation. When the predicted temperature change value T is slightly higher than the threshold temperature change value Tth when the next seek operation is completed, the restriction value of the driving current is set to be slightly smaller than the value set for the previous seek operation. In this manner, the value T is kept close to the value Tth.

In FIG. 5, the difference between the value T found immediately before one seek operation and the value Tth is ΔT1, and the commanded current value is set to be smaller by a prescribed value (ΔI1). In the case where a difference ΔT2 between the value T and the value Tth after a subsequent seek operation is larger than the difference ΔT1, the commanded current value is set to be smaller by a prescribed value ΔI2, which is larger than ΔI1. Therefore, even when the relationship between the commanded current value and the amount of the current actually supplied to the disk motor 4 varies, the temperature change can be kept close to the threshold temperature change value Tth.

As described above, according to the first example of the present invention, the current flowing through the motor coil 29 of the disk motor 4 is calculated as J·A(i)/Kt (J is the inertia, and Kt is the torque constant of the disk motor 4). The torque constant Kt, which is the proportionality constant between the motor torque and the driving current, is constant with little dispersion in most of the operation range of the disk motor 4. Therefore, the acceleration A(i) and the amount of the current are always proportional to each other. Regardless of the value of the acceleration A(i), the current value can be calculated accurately.

The optical disk 2 generally used is molded at a high precision so as to be in conformity with predetermined standards. Accordingly, there is substantially no calculation error of the current value caused by the dispersion in the inertia, except when the disk diameter is different. When the disk diameter is different, the first constant α is changed so as to match the inertia to the disk diameter. Therefore, the current value can always be calculated accurately.

The acceleration A(i) is calculated using the average speed N'(n) which is obtained by the digital filter 13 from the speed N(n), instead of using the speed N(n) calculated based on a pulse which is output by the speed calculator 12. In this way, even when the pulse output by the speed calculator 12 includes a large error, the influence of the error can be reduced so as to improve the calculation precision of the acceleration A(i). Therefore, the current value can be found accurately.

Regarding the calculation of the heat generation, both the heat quantity generated in the motor coil 29 and the friction-generated heat quantity caused at the bearing of the disk motor 4 are calculated. This improves the accuracy of the prediction of the heat quantity of the disk motor 4.

During a seek operation, the restriction value of the driving current is changed from the value set for the previous seek operation in accordance with the difference between the predicted temperature change value T(k) and the predetermined threshold temperature change value Tth. Even when the input and output gains of the motor driver 17 vary due to the dispersion of various characteristics, the temperature change value can be kept close to the threshold temperature change value Tth.

When the rotation speed of the disk motor 4 is in the range in which recording or reproduction is impossible during a seek operation, the rotation of the disk motor 4 is accelerated or decelerated at the maximum acceleration or deceleration. After the rotation speed reaches the range in which recording or reproduction is possible, the amount of the driving current supplied to the disk motor 4 is restricted. Therefore, the heat generation in the disk motor 4 can be suppressed without significantly extending the time period required for the rotation of the disk motor to reach the range in which recording or reproduction is possible.

When the recording or reproduction is completed while the rotation of the disk motor 4 is accelerated or decelerated during the seek operation, the acceleration or deceleration is stopped on that point. Therefore, the time period in which a huge amount of current is supplied to the disk motor 4 is prevented from being unnecessarily extended, which prevents unnecessary heat generation.

When the predicted temperature change value T exceeds the threshold temperature change value Tth during a seek operation, the restriction value of the driving current is lowered. Thus, a temperature rise can be further restricted.

In this example, the digital filter 13 calculates the average speed N'(n) from the speed N(n) based on expression (3). Alternatively, the average speed N'(n) may be calculated based on, for example, expression (10) shown below.

$$N'(n)=(N(n)+N(n-1) \ldots +N(n-m))/m \quad (10)$$

In this example, the heat quantity El(i) generated in the motor coil 29 is calculated using the acceleration A(i) as shown in expression (7). Alternatively, the heat quantity E1(i) generated in the motor coil 29 may be calculated using, for example, expression (11) shown below. Expression (11) uses, instead of the acceleration A(i), a differential value of the speed which has a significance physically equivalent to the acceleration.

$$E1(i)=\alpha \cdot (N'(j \cdot i)-N'(j \cdot (i-1)))^2/\Delta t(i) \quad (11)$$

In this example, the acceleration A(i) is calculated every j'th pulse generated by the movement distance indicating device 10. The value of j is not necessarily constant, and may be changed during the operation.

EXAMPLE 2

Figure 6:
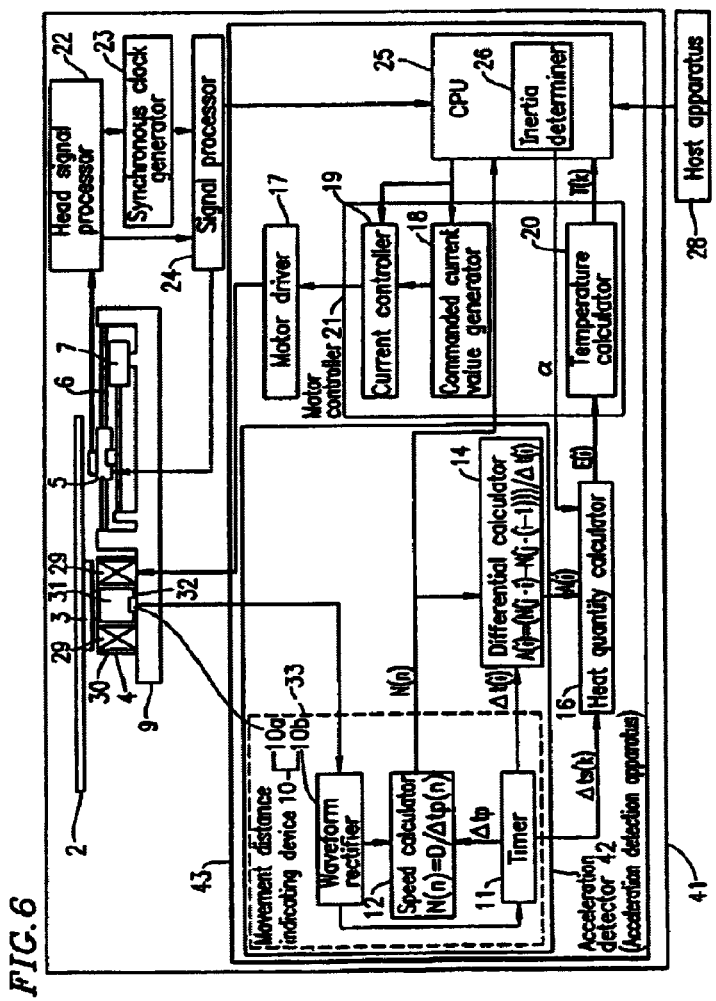
FIG. 6 is a schematic diagram illustrating a structure of a motor controller and an optical disk apparatus including the motor controller according to a second example of the present invention.

FIG. 6 is a schematic diagram illustrating a structure of an optical disk apparatus 41 according to a second example of the present invention.

The optical disk apparatus 41 is different from the optical disk apparatus 1 (FIG. 1) according to the first example in that an acceleration detector (acceleration detection device) 42 of a motor control device 43 of the optical disk apparatus 41 does not include a digital filter. Except for this point, the optical disk apparatus 41 has the same structure as that of the optical disk apparatus 1. Identical elements previously discussed with respect to FIG. 1 bear identical reference numerals and the descriptions thereof will be omitted.

The acceleration detector 42 operates in the following manner.

The speed calculator 12 and the differential calculator 14 calculate the acceleration A(i) from the speed N(n) of the disk motor 4 by expression (1) shown above and expression (2) shown below, and output the acceleration A(i) to the heat quantity calculator 16.

$$A(i)=(N(j \cdot i)-N(j \cdot (i-1)))/\Delta t(i) \quad (2)$$

In the second example, j is an integer obtained by multiplying the number of pulses generated by the movement distance indicating device 10 while the disk motor 4 rotates once by an integer. For example, when six pulses are generated while the disk motor 4 rotates once, j is a multiple of 6. Δt(i) is a time duration from the time when the (j·i)th pulse is generated by the movement distance indicating device 10 until the time when the j·(i−1)th pulse is generated by the movement distance indicating device 10. The predicted temperature change value T(K) is calculated from the acceleration A(i) in a manner similar to that of the first example.

The motor control device 43 and the optical disk apparatus 41 including the motor control device 43 operate, for example, in the following manner.

The operation is the same as that of the optical disk apparatus 1 until the CPU 25 initializes various variables, the disk motor 4 starts rotating, and the speed calculator 12 calculates the speed N(n).

After the speed N(n) found by the speed calculator 12, the acceleration detector 42 calculates the acceleration A(i) in accordance with expression (2) using the speed N(n) found by the speed calculator 12. In expression (2), j is set to be an integer obtained by multiplying the number of pulses which are generated by the movement distance indicating device 10 while the disk motor 4 rotates once as described above. Therefore, the acceleration A(i) can always be found based on the pulses which are generated by the same magnetic pole among the plurality of magnetic poles of the magnet 31 of the disk motor 4.

For example, it is assumed that the plurality of magnetic poles in the magnet 31 are provided with a positional error, and a pulse generated by a magnetic pole of the magnet 31 having a positional error corresponds to a rotation angle of D+e (e: error component) and the pulse generated next corresponds to a rotation angle of D−e. When the disk motor 4 rotates at a constant speed of N0, the speeds found by expression (1) based on these pulses are represented by expressions (12) and (13), respectively. Both speeds have an error with respect to the actual rotation speed N0.

$$N0 \cdot D/(D+e) \quad (12)$$

$$N0 \cdot D/(D-e) \quad (13)$$

An acceleration which is calculated based on the speeds found from these continuous pulses has a positive value, although the disk motor 4 is rotated at a constant speed with an acceleration of 0.

However, in this example, the rotation speed is always found based on the pulses generated by the same, prescribed magnetic pole among the plurality of magnetic poles of the magnet 31, as described above. Therefore, even when the prescribed magnetic pole has a positional error, the same positional error is reflected on the pulses. For example, when the error component is +e. Therefore, the rotation speeds are calculated based on the pulses corresponding to the rotation angle D+e, the calculated rotation speeds are all equal to a product of multiplication of the actual speed by D/(D+e). Accordingly, the difference in the speed calculated based on these resultant speeds becomes 0 when the disk motor 4 rotates at a constant speed. Thus, the acceleration can be correctly found to be 0.

As described above, according to the second example, the calculation error of the acceleration caused by the positional error of magnetic poles can be substantially completely removed by calculating the acceleration based on the pulses which are generated each time the disk motor 4 rotates an integral number of times (for example, once or twice).

Figure 7:
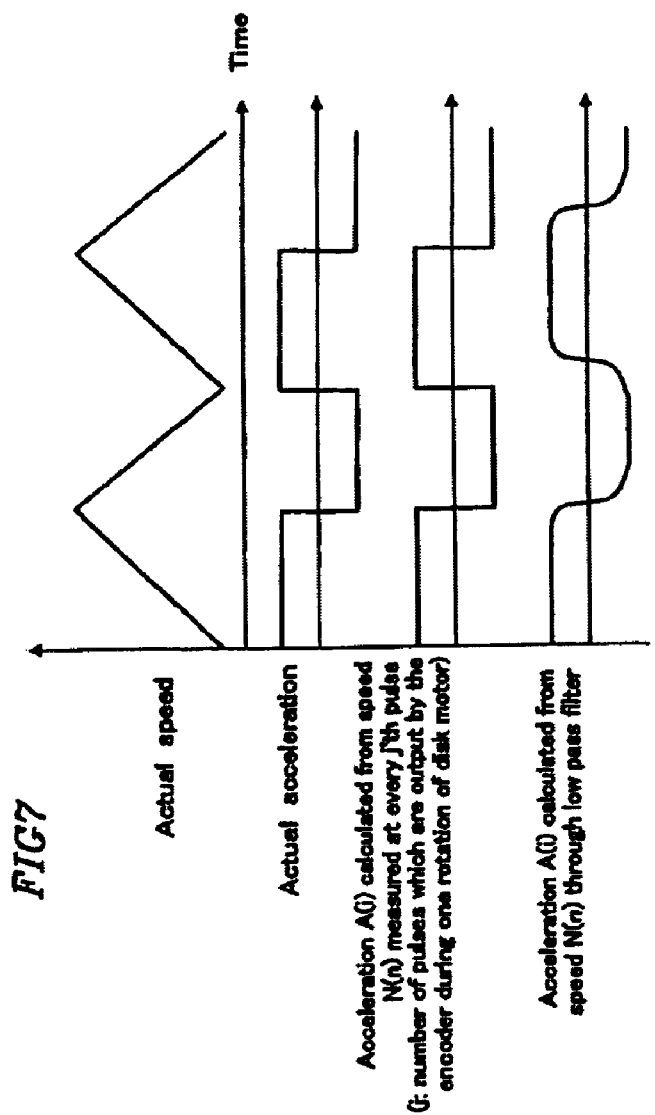
FIG. 7 is a timing diagram illustrating an example of a change of the rotation speed when a disk motor in the optical disk apparatus is accelerated or decelerated in repetition according to the second example.

FIG. 7 is a timing diagram illustrating an example of a change of the rotation speed when the disk motor 4 (FIG. 6) is accelerated or decelerated repeatedly. As shown in FIG. 7, according to the second example, even when the actual speed of the disk motor 4 is rapidly increased or reduced repeatedly, the acceleration A(i) can be obtained to substantially match the actual acceleration at a high precision.

When the positional error of the magnetic poles of the magnet 31 of the disk motor 4 is excessively large, the speed N(n) is processed by a low pass filter with a reduced cut-off frequency. Thus, the influence of the positional error can be reduced. However, in this case, when the acceleration of the disk motor 4 is rapidly changed, the calculated acceleration cannot follow the actual acceleration and a time delay is generated as shown in FIG. 7. Especially when the rotation speed is sufficiently high to involve the problem of heat generation, the influence of the positional error of the magnetic poles appears as a larger error. Accordingly, the cut-off frequency of the low pass filter needs to be further reduced, which causes a further time delay. Such an influence of the positional error of the magnetic poles can be substantially eliminated by calculating the acceleration based on the pulses which are generated each time the disk motor 4 rotates an integral number of times (for example, once or twice) as in this example. The acceleration detection accompanies a time delay corresponding to one rotation of the disk motor 4. However, the influence of the time delay is reduced at rotation speeds sufficiently high to involve the problem of generation. Therefore, a highly precise acceleration detection is possible.

Pulses to be used for acceleration detection from among the plurality of pulses which are generated while the disk motor 4 rotates once can be selected in the following manner. Each time a pulse is generated, the speeds calculated by expression (1) are averaged for one rotation (or for an integer number of rotations) of the disk motor 4. Thus, the pulses, based on which the speeds closest to the average speed were found, are used. In this manner, the speed calculation precision and the acceleration detection precision can further be improved.

The operations of the heat quantity calculator 16 and the temperature calculator 20 which are performed based on the detected acceleration are the same as those in the first example.

Next, a seek operation for moving the optical head 5 in a radial direction of the optical disk 2 to a desired position above the optical disk 2 in order to perform information recording or reproduction will be described.

Figure 8:
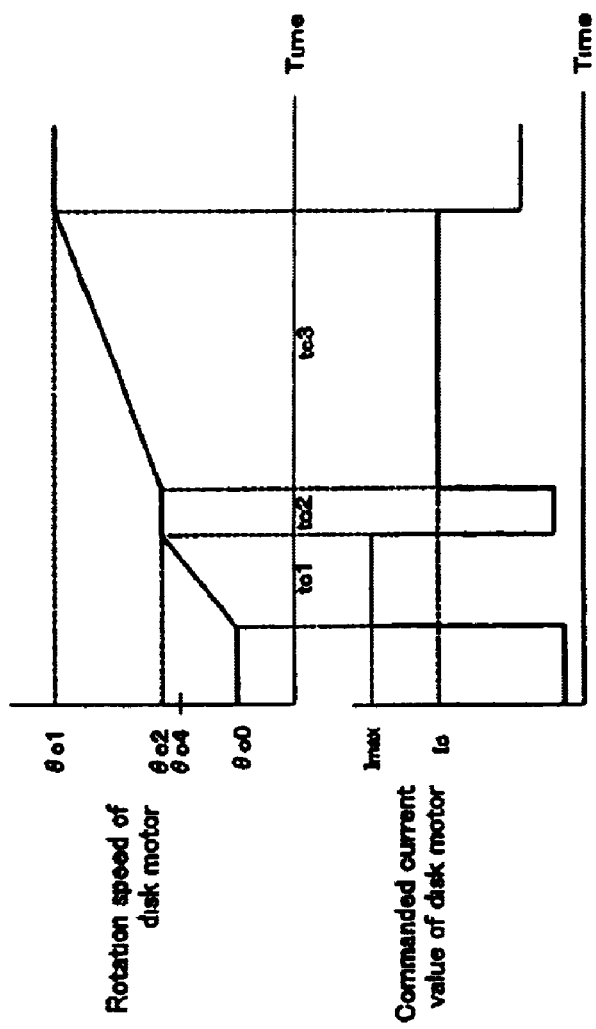
FIG. 8 is a timing diagram illustrating a seek operation when an intended rotation speed is relatively high according to the second example.

FIG. 8 is a timing diagram illustrating an example of a change of the rotation speed of the disk motor 4 during a seek operation.

When the host apparatus 28 issues a request to record or reproduce information, the CPU 25 calculates an intended position at which the information recording or reproduction is to be performed. The CPU 25 drives the head transporting motor 7 to transport the optical head 5 to the intended position. Simultaneously, the CPU 25 notifies the commanded current value generator 18 of the intended position. The commanded current value generator 18 calculates a rotation speed of the disk motor 4 required at the intended position as the intended rotation speed θc1.

When the predicted temperature change value T calculated by the temperature calculator 20 is lower than the threshold temperature change value Tth and the rotation speed θc0 before the seek operation is outside the range in which recording or reproduction is possible (θc2 to θc1), the CPU 25 instructs the current driver 19 not to restrict the driving current. Then, the motor driver 17 receives the maximum commanded current value (Imax) and thus supplies the corresponding driving current to the disk motor 4. The disk motor 4 starts acceleration at the maximum acceleration (period tc1).

Next, when the rotation speed of the disk motor 4 reaches θc2 at which generation of a synchronous clock is possible and then at θc2 at which recording or reproduction is possible, the commanded current value generator 18 sets the intended rotation speed to θc2 for a prescribed time period (tc2; for example, about 50 ms). Then, the commanded current value generator 18 re-sets the intended rotation speed to θc1. Thus, the disk motor 4 once stops accelerating and rotates at a constant speed θc2, and then the rotation of the disk motor 4 is accelerated to the rotation speed θc1 (period tc3).

Using such an operation (i.e., once stopping the acceleration or deceleration of the disk motor 4 when the rotation speed of the disk motor 4 reaches the range in which recording or reproduction is possible), the amount of the current flowing through the disk motor 4 is temporarily reduced, thus generating a cooling period. Consequently, the temperature rise can be restricted.

During period tc3, the current controller 19 restricts the driving current and thus the commanded current value is restricted to Ic. Therefore, the driving current supplied to the disk motor 4 can be reduced so as to suppress the temperature rise.

Figure 9:
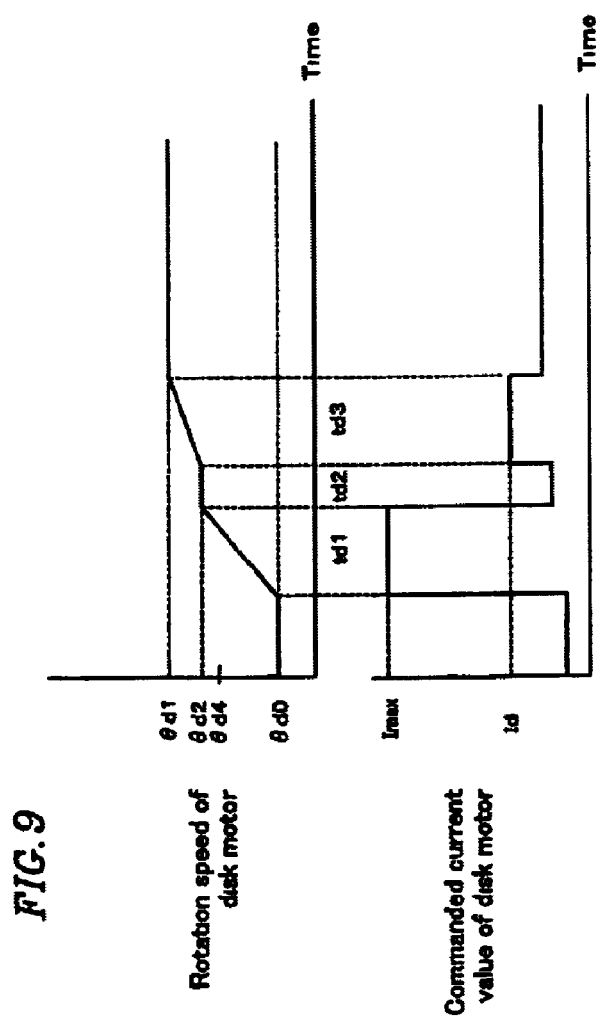
FIG. 9 is a timing diagram illustrating a seek operation when an intended rotation speed is relatively low according to the second example.
Figure 10:
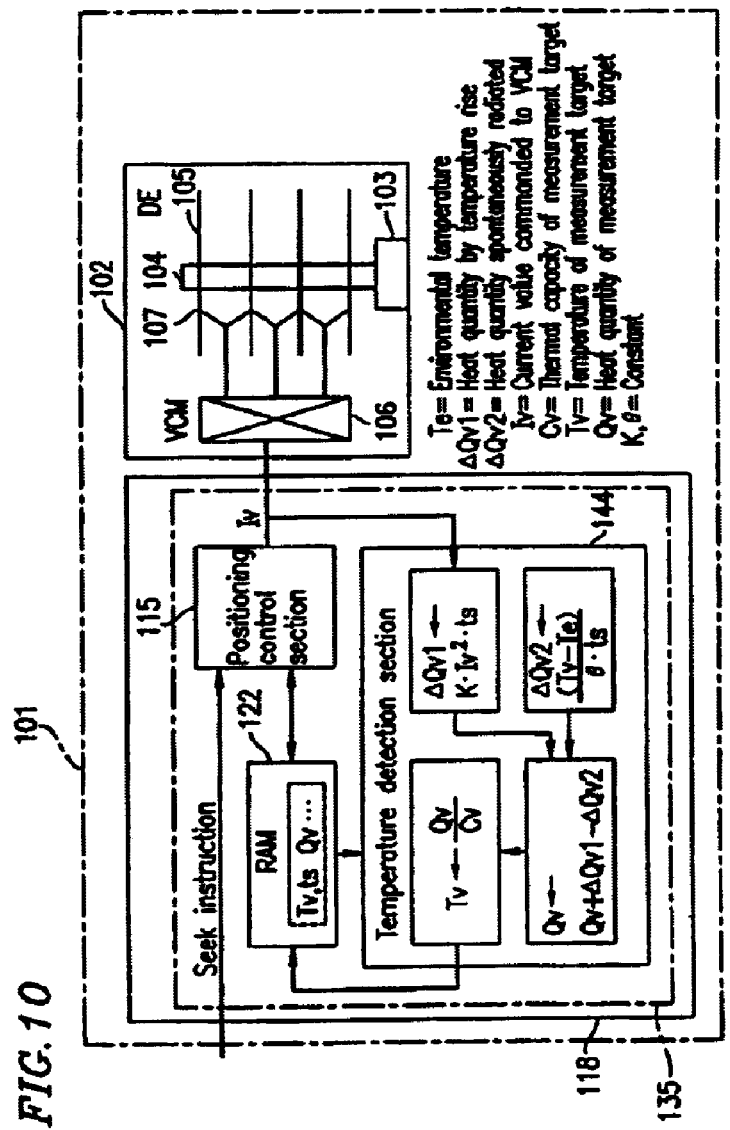
FIG. 10 is a schematic view illustrating a conventional optical disk apparatus.
Figure 11:
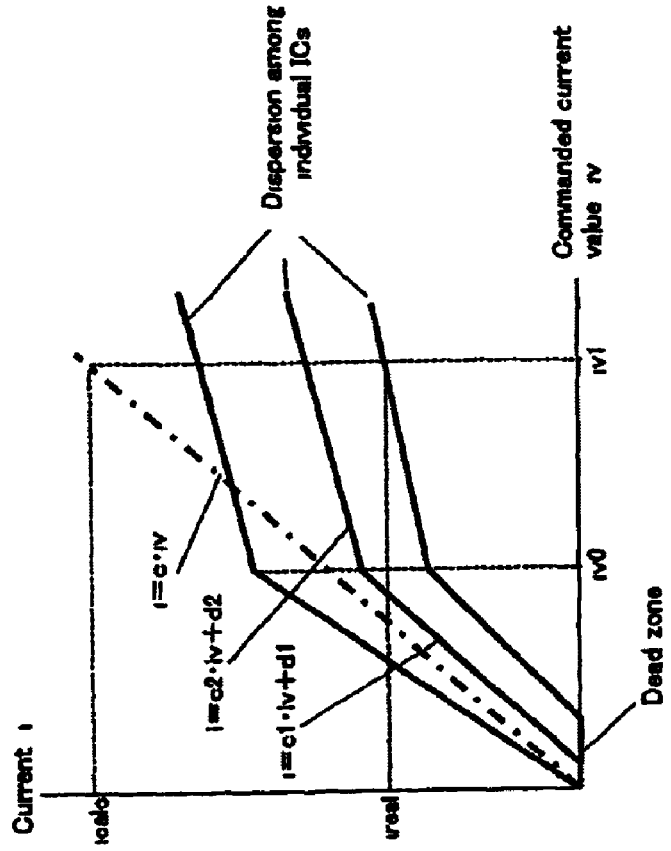
FIG. 11 is a diagram illustrating the relationship between the commanded current value and the driving current of a motor in a motor driver IC.

Next, with reference to FIG. 9, a seek operation performed when the intended rotation speed is θd1, which is lower than θc1 will be described. FIG. 9 is a timing diagram illustrating an example of a change of the rotation speed of the disk motor 4 during such a seek operation.

The operations performed during periods td1 and td2 are the same as those in periods tc1 and tc2 in FIG. 8. In period td3 in which the rotation of the disk motor 4 is accelerated in the range in which recording or reproduction is possible (θd2 to θd1), the current controller 19 restricts the driving current. At this point, the restriction value Id of the commanded current value set by the current controller 19 varies in accordance with the intended rotation speed (θd1). As the intended rotation speed θd1 is higher, the restriction value of the driving current is set to be large.

For example, the intended rotation speed θc1 in FIG. 8 is higher than the intended rotation speed θd1 in FIG. 9. Therefore, the restriction value Ic of the commanded current value in FIG. 8 is larger than the restriction value Id in FIG. 9. Usually, the friction force between the optical disk 2 and the air, which is generated when the optical disk 2 rotates, is higher as the rotation speed is higher. In order to control the disk motor 4 to have a high intended rotation speed, a larger motor torque and a larger driving current are necessary than in order to control the disk motor 4 to have a lower intended rotation speed. When the restriction value of the driving current is excessively small, it takes an excessively long time period to reach the intended rotation speed, or the rotation speed never reaches the intended speed. Accordingly, during period td3 immediately before the rotation speed of the disk motor 4 reaches the intended speed, the restriction value of the driving current needs to be larger as the intended rotation speed is higher. With such setting, whatever the intended rotation speed may be, the rotation speed of the disk motor 4 can reach the intended speed in a short period of time, and a stable operation is realized.

In this example, after the CPU 25 confirms that the disk motor 4 reaches the rotation speed range in which recording or reproduction is possible, the current controller 19 restricts the driving current. This operation of the CPU 25 may be omitted. In this case, after the CPU 25 instructs the intended rotation speed to the commanded current value generator 18, the commanded current value generator 18 calculates the rotation speed range in which recording or reproduction is possible based on the intended rotation speed, and notifies the current controller 19 of the calculated range. During a seek operation, the current controller 19 monitors the rotation speed of the disk motor 4. When the rotation speed reaches the calculated range, the driving current is restricted. Such an operation can simplify the control performed by the CPU 25. In addition, this operation makes it possible to determine, before the seek operation is started, whether the rotation speed at that time is within the range in which recording or reproduction is possible. If the rotation speed is within this range, the disk motor 4 rotates at a constant speed immediately after the seek operation starts. The acceleration or deceleration of the rotation of the disk motor 4 is started when the transportation of the optical head 5 is completed. In this manner, the heat generation in the disk motor 4 can significantly be restricted especially when seek operations are continuously performed.

As described above, using the operation of stopping the acceleration or deceleration of the rotation of the disk motor 4 within the rotation speed range in which recording or reproduction is possible, the time period in which a huge amount of current flows through the disk motor 4 can be shortened and thus the heat quantity generated in the disk motor 4 can be reduced.

In this example, the upper limit of the range of the commanded current values (Ic, Id) is made constant while the rotation of the disk motor 4 is accelerated or decelerated within the rotation speed range in which recording or reproduction is possible. Alternatively, the upper limit of the range of the commanded current values (Ic, Id) can be set only immediately before the rotation speeds reaches the intended rotation speed, and the upper limit can be smaller in the remaining period. In this case, the heat quantity generated in the disk motor 4 can further be reduced.

As described above, according to the second example of the present invention, the acceleration A is calculated when the disk motor 4 rotates once or an integral number of times. The acceleration is calculated based on pulses which are generated by a specific magnetic pole of the magnet 31 of the disk motor 4. Thus, the error caused by the positional error of the magnetic poles can be substantially eliminated. Therefore, the acceleration can be calculated highly precisely with very little time delay. As a result, the precision in predicting the temperature rise can be significantly improved.

During a seek operation, when the rotation speed of the disk motor 4 reaches the range in which recording or reproduction is possible, the acceleration or deceleration is stopped for a prescribed time period. Therefore, the heat generation in the disk motor 4 can be suppressed without substantially delaying recording or reproduction.

The upper limit (i.e., the restriction value) of the driving current within the rotation speed range in which recording or reproduction is possible is set to be larger as the intended rotation speed is higher. Accordingly, the rotation speed of the disk motor 4 can be caused to reach a high intended rotation speed in a sufficiently short time period. In the case where the rotation speed of the disk motor 4 is caused to reach a low intended rotation speed, the temperature rise can be suppressed.

The CPU 25 and the inertia determiner 26 provided in the motor control devices 27 and 43 in the first and second examples may be provided outside the motor control devices 27 and 43.

The acceleration detector 42 preferably calculates the acceleration based on the pulses which are generated each time the disk motor 4 rotates once or an integral number of times. However, pulses which are generated each time the motor 4 rotates the number of times obtained by multiplying one by any number may be used alternatively.

A speed detection device 33 can be structured including the movement distance indicating device 10, the timer 11, and the speed calculator 12. Like the acceleration detector 42 described above, the speed detection device 33 calculates the speed based on pulses which are generated each time the disk motor 4 rotates once or an integral number of times (for example, once or twice). Accordingly, the speed calculation error caused by the positional error of the magnetic poles can be eliminated substantially completely.

As described above, a motor control device according to the present invention calculates a heat quantity generated in a motor (motor coil 29) based on an acceleration of the motor, which is in proportion to a driving current of the motor. Even when the amount of the driving current changes, the heat quantity can be predicted from the rotation acceleration and thus a temperature change can be predicted at high precision. Since the motor can be controlled based on the highly precise temperature prediction, overheating and destruction of the components caused by a temperature rise can be prevented.

According to the present invention, the heat quantity is calculated based on both the heat quantity of the motor coil, which is found from the acceleration, and the friction-generated heat quantity caused by the friction at the bearing of the motor, which is found from the rotation distance. Therefore, a motor control device according to the present invention can predict a temperature change at higher precision.

An acceleration detection device according to the present invention calculates an acceleration of the motor based on the speed of the motor each time the motor rotates once or an integral number of times. Therefore, the error of the calculation of the acceleration caused by a positional error of the magnetic poles of the magnet of the motor can be eliminated substantially completely. Thus, the acceleration can be found at high precision.

According to the present invention, even when an optical disk having a different diameter is mounted, the heat quantity is calculated from the acceleration based on the difference in inertia among optical disks having different diameters. Therefore, a motor control device according to the present invention can predict a temperature rise at high precision.

According to the present invention, when the rotation speed of the motor is within a range in which recording or reproduction is possible, or when the predicted temperature change exceeds a prescribed threshold level, the driving current of the motor is restricted. Therefore, an optical disk apparatus according to the present invention suppresses the heat quantity generated in the motor and thus causes very little temperature rise.

According to the present invention, the restriction value of the driving current is changed in accordance with the amount by which the temperature change exceeds a prescribed threshold level. Therefore, an optical disk apparatus according to the present invention keeps the temperature change to equal to or less than the threshold level even when the input and output gains of the motor driver vary.

According to the present invention, when the motor is accelerated or decelerated while the optical disk apparatus is in a wait state after completing recording or reproduction, the acceleration or deceleration of the motor is stopped. Therefore, the unnecessary operation can be eliminated. Thus, an optical disk apparatus according to the present invention causes very little temperature rise.

According to the present invention, when the rotation speed of the motor is in a range in which recording or reproduction is possible, the rotation speed is maintained constant for a prescribed period. Therefore, an optical disk apparatus according to the present invention suppresses the heat generation and reduces the temperature rise without substantially delaying the recording or reproduction.

According to the present invention, the upper limit of the range of commanded current value for a seek operation is set to be higher as the intended rotation speed increases. Therefore, an optical disk apparatus according to the present invention maintains the rotation speed close even to a high intended rotation speed. When the intended rotation speed is relatively low, the heat generation is suppressed and the temperature rise is reduced.

According to the present invention, the magnetic flux of the rotor of the motor is performed by the movement distance indicating device (sensor section and waveform rectifier). Such a movement distance indicating device is usually provided in an apparatus including a motor, the rotation speed of which needs to be detected. In order to calculate the heat quantity of the motor from the acceleration of the motor, such a movement distance indicating device can be used. A separate temperature sensor, current detector or the like is not necessary unlike conventional apparatuses. According to the present invention, the structure of the motor can be simplified, and the cost of the components and the number of steps of assembly can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk apparatus, comprising:
   a motor for rotating a disk;
   an optical head for recording information on the disk or for reproducing information from the disk;
   a motor driver for supplying a driving current to the motor;
   a motor controller for setting the driving current;
   a speed calculator for calculating a rotation speed of the motor; and
   a determiner for determining whether or not the rotation speed of the motor is within a range in which recording of information to the disk or reproduction of information from the disk by the optical head is possible,
   wherein when the determiner determines that the rotation speed of the motor is within the range, the motor controller restricts the driving current to a restriction value $I_a$.

2. A disk apparatus, comprising:
   a motor for rotating a disk;
   an optical head for recording information on the disk or for reproducing information from the disk;
   a motor driver for supplying a driving current to the motor;
   a motor controller for setting the driving current;
   a synchronous clock generator for generating a synchronous clock based on a reproduction signal which is read from the disk by the optical head;

a speed calculator for calculating a rotation speed of the motor; and a determiner for determining whether or not the rotation speed of the motor is within a range in which generation of the synchronous clock is possible, wherein when the determiner determines that the rotation speed of the motor is within the range, the motor controller restricts the driving current to a restriction value $I_a$.

3. A disk apparatus, comprising:

a motor for rotating a disk;

an optical head for recording information on the disk or for reproducing information from the disk;

a motor driver for supplying a driving current to the motor;

a motor controller for setting the driving current;

a head transporting device for transporting the optical head to a prescribed position above the disk at which recording or reproduction of information is to be performed by the optical head;

a speed calculator for calculating a rotation speed of the motor; and a determiner for determining, during a seek operation in which the head is transported, whether or not the rotation speed of the motor is within a range in which information recording to the disk or information reproduction from the disk by the optical head is possible, wherein when the determiner determines that the rotation speed is within the range, the motor controller restricts the driving current to a restriction value $I_a$ so that the rotation speed of the motor is constant for a prescribed time period.

* * * * *